United States Patent Office 3,759,900
Patented Sept. 18, 1973

3,759,900
OPTICAL BRIGHTENING AGENTS
Walter Horstmann, Cologne-Buchheim, Germany, assignor to Bayer Aktiengesellschaft, Leverkusen, Germany
No Drawing. Filed June 4, 1970, Ser. No. 43,580
Claims priority, application Germany, June 11, 1969, P 19 29 664.1
Int. Cl. C07d 55/22
U.S. Cl. 260—240 B    6 Claims

ABSTRACT OF THE DISCLOSURE

Optical brighteners on the basis of salts of sulphonic acids of the formula

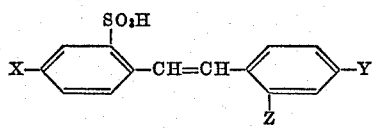

in which X denotes a triazine, triazole, naphthotriazole, pyrazole, acylamino or urea radical; Y represents H, Cl, CN or X; Z denotes H or —$SO_3H$,
with guanidines of the general formula

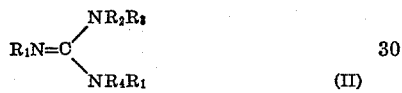

in which $R_1$ denotes H, $NH_2$, alkyl or a carbocyclic radical; $R_2$, $R_3$, $R_4$ and $R_5$ represent H, alkyl, a carbocyclic radical; and $R_2$ together with $R_3$ or $R_4$ together with $R_5$ may also denote an alkylene radical linked to the N-atom,
compared with the free sulphonic acid or the alkali metal salts of the stilbene-sulphonic acids (I), the salts with guanidines (II) have advantages in respect of their sensitivity to hardness, in the brightening of mixed fabrics and in simultaneous high quality finishing and optical brightening.

---

The subject-matter of the present invention comprises salts of sulphonic acids of the general formula

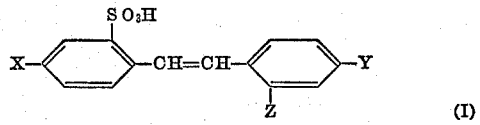

in which X denotes an optionally substituted 1,3,5-triazine, 1,2,3-, 1,2,4-, 2,1,3-triazole, 2,1,3-naphthotriazole, pyrazole, acylamino or urea radical; Y represents a hydrogen or chlorine atom, a group —CN or X; Z means a hydrogen atom or a sulphonic acid group, with guanidines of the general formula

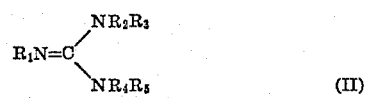

in which $R_1$ denotes an amino group, a hydrogen atom, an optionally substituted alkyl radical or an optionally substituted carbocyclic radical; $R_2$, $R_3$, $R_4$ and $R_5$ represent a hydrogen atom, an optionally substituted alkyl radical or an optionally substituted carbocyclic radical; and $R_2$ together with $R_3$ or $R_4$ together with $R_5$ may also denote an alkylene radical linked to the N-atom.

The salts correspond to the formula

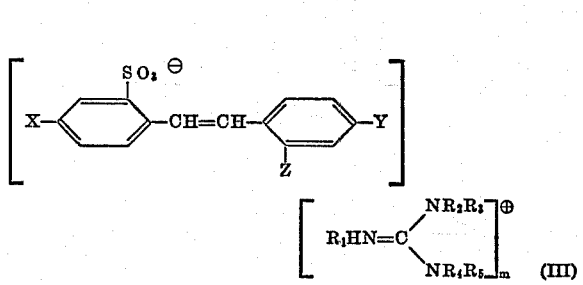

in which X, Y, Z, $R_1$, $R_2$, $R_3$, $R_4$, and $R_5$ have the same meaning as above, and $m$ denotes an integer corresponding to the number of groups —$SO_3^\ominus$ present in the stilbene molecule; $m$ can have the values 1–4, for example.

Suitable radicals X and Y are, for example, 1,3,5-triazine radical of the general formula

in which A stands for an optionally substituted amino group, an optionally substituted alkoxy group, a hydroxy group or halogen, and B represents an optionally substituted amino group.

Examples of radicals A are:

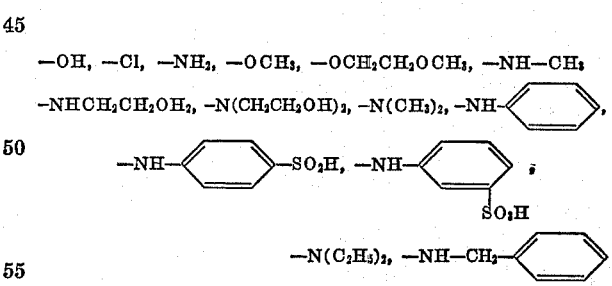

Examples of radicals B are:

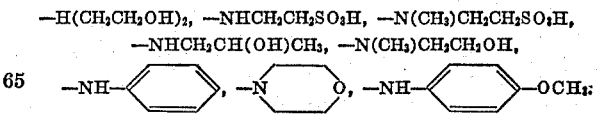

Other suitable radicals X and Y are, for example, triazoles, naphthotriazoles and pyrazoles which may be substituted by substitutents such as alkyl radicals or by phenyl radicals which, in turn, may be further substituted, such as:

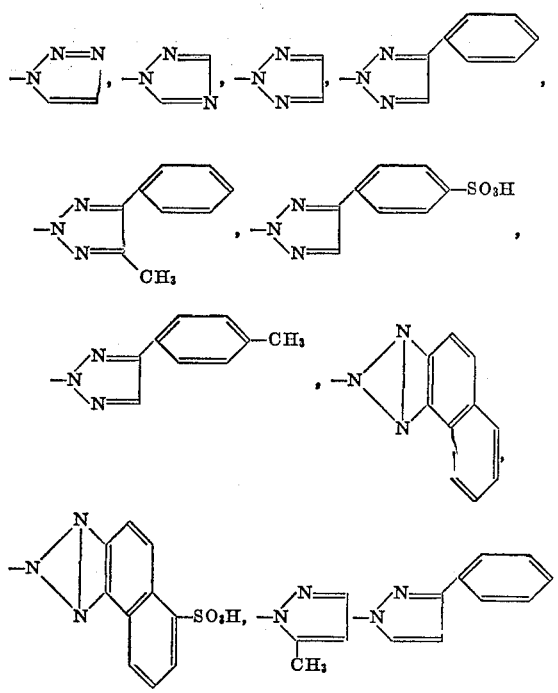

Suitable acylamino groups are primarily phenylcarbonylamino groups which are further substituted, such as:

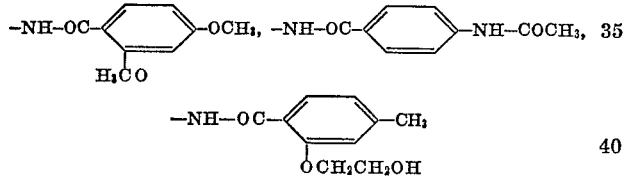

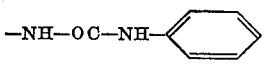

as well as urea groups such as

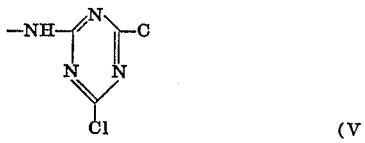

Suitable alkyl radicals $R_1$–$R_5$ are primarily those with 1–18 carbon atoms.

Suitable carbocyclic radicals $R_1$–$R_5$ are primarily cycloalkyl radicals such as cyclohexyl radicals.

Particularly suitable Compounds III are those in which X and Y stand for radicals of the formula -NH-[triazinyl with Cl]-C  (V)

in which C denotes an optionally substituted alkoxy or amino group, and Z represents the group —$SO_3^{\ominus}$, as well as those in which X represents an optionally substituted 2,1,3-naphtho-(1,2)-triazole radical, Y means a 1,2,3-triazole radical, and Z is the group —$SO_3^{\ominus}$; and also those in which X and Y mean an optionally substituted 2,1,3-triazole radical and Z again denotes the group —$SO_3^{\ominus}$.

The salts of the General Formula III are prepared by reacting sulphonic acids of the Formula I or their salts, especially their alkali metal or ammonium salts, with the salts of guanidines of the Formula II, especially the sulphate, chlorides and carbonates, in an aqueous or organic medium at temperatures of about 20–120° C. and, if desired, under pressure.

The salts (III) so obtained can be used as brightening agents either directly or after being finely ground or formulated as a liquid. Suitable solvents for the liquid formultion are, for example, formamide, dimethyl formamide, dimethyl sulphoxide, ethylene glycol and higher glycols, glycols monomethyl and -ethyl ether, diethanolamine and triethanolamine.

Guanidine salts suitable for the preparation of the salts (III) are, for example, the salts of the following guanidines:

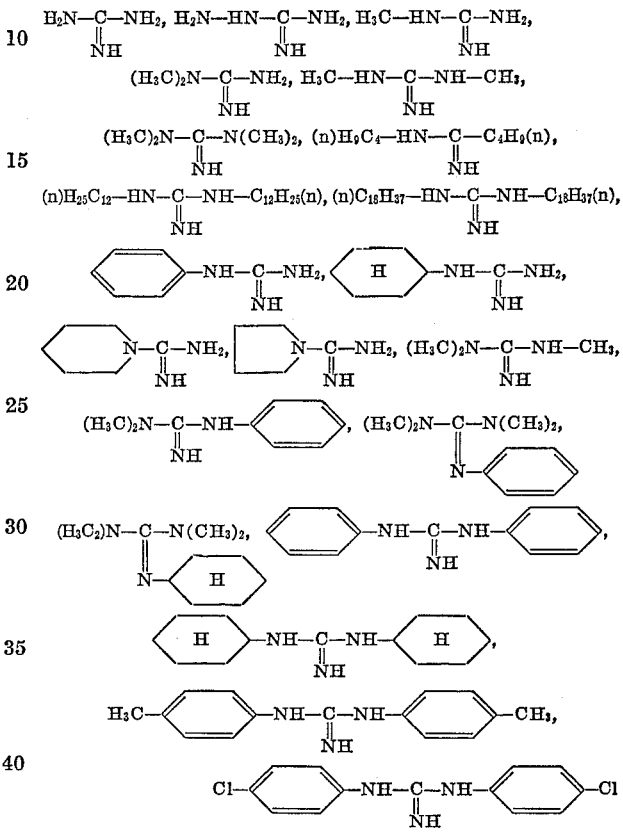

The stilbene compounds of the Formula I and their salts are known and have been described many times in the literature.

Compounds of the General Formula I in which X and Y denote an optionally substituted, 2,1,3-triazole radical and Z is a group —$SO_3H$ are, for example, the subject-matter of French patent specifications No. 1,480,699 and 1,463,324; compounds of the Formula I in which X and Y denote a triazinyl-amino radical substituted by chlorine and Z means a group —$SO_3H$ are described, for example, in Belgian patent specification Nos. 620,472 and 681,277. Further compounds of the Formula I in which X and Y represent substituted 1,3,5-triazinyl-amino radicals and Z is a group —$SO_3H$ are mentioned, for example, in French patent specifications Nos. 1,298,533; 1,378,406 and 1,382,479. Compounds of the Formula I in which X is an optionally substituted 2,1,3-naphtho-(1,2)-triazole radical; Y means an optionally substituted 1,2,3-triazole radical; and Z is a hydrogen atom or a group —$SO_3H$, are the subject-matter of German patent specification No. 1,008,248.

The compounds of the Formula III are suitable for the brightening of natural and synthetic materials, for example, fibre materials of cotton, viscose, aromatic polyesters or polyamides or mixtures of such fibre materials. They are also suitable for brightening synthetic materials such as polyvinyl chloride, polyethylene and polycarbonate, and for the spin-brightening of aromatic polyesters. The brightening agents can be applied from an aqueous or organic medium.

Compared with the free sulphonic acid or the alkali metal salts of the stilbene-sulphonic acids (I), the guanidine salts of the Formula III have advantages in respect of their sensitivity to hardness, in the brightening of mixed fabrics and in simultaneous high quality finishing and optical brightening, as will be seen from the following examples.

EXAMPLE 1

67 g. of the disodium salt of the compound

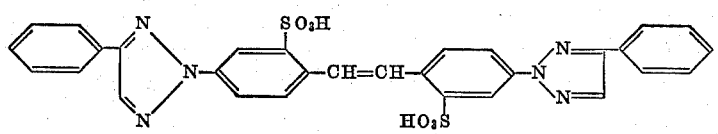

(1)

are suspended in 1000 ml. of water at 25–30° C., a solution of 50 g. of guanidinium sulphate in 200 ml. of water is added, the mixture is stirred for one hour, suction-filtered, the residue is washed with a little water and dried at 40° C. in a vacuum. There are obtained 71 g. of the guanidinium salt of the Compound 1, which can be recrystallised from dimethyl formamide/water 2:1; melting point >360° C.

A fabric of polyamide fibres is dyed at 85° C. for 30 minutes in a liquor ratio of 1:40 (exhaust process) at pH value of 4 (acetic acid) in the presence of 0.5 g./litre nonylphenol decaglycol ether, with 0.2% of the guanidinium salt so obtained, and then dried. A second piece of fabric is dyed in the same way with equivalent amounts of the Starting Compound 1. Comparison of the dyeings shows that a better brightening effect is achieved with the guanidinium salt.

EXAMPLE 2

268 g. of the disodium salt of the Compound 1 given in Example 1 are suspended in 2000 ml. of water at 70–80° C. A solution of 215 g. diphenyl-guanidine hydrochloride in 2000 ml. of water is then added with good stirring, the mixture is stirred at 70–80° C. for three hours, suction-filtered at 30–40° C., the residue is washed portionwise with 500 ml. of water and dried in a vacuum at 50° C. The yield amounts to 314 g. of the diphenyl-guanidinium salt of the Compound 1.

In a dyebath containing 1.5 g./litre sodium chlorite, 1 g./litre oxalic acid and 1 g./litre sodium hexametaphosphate, a lace of polyamide/viscose is dyed at 85° C. for 45 minutes with 0.2% of the guanidinium salt of the Compound 1 so prepared (liquor ratio 1:20). The viscose component as well as the polyamide component of the lace exhibit the same good brightening effect. In contrast thereto, the Starting Compound 1 mentioned in the example brightens only the polyamide component of the lace.

The guanidinium salt is also suitable for application in high quality finishing (acidic wet cross-linking) of cotton popeline: if, for example, such a fabric is padded cold on a foulard with a liquor containing 250 g./litre of a dimethylol-dihydroxy-ethylene-urea, 100 g./litre hydrochloric acid and 1 g./litre of the guanidine salt, allowed to rest at 25° C. for 20 hours, then neutralised with a 0.1% sodium carbonate solution, rinsed with water and dried, a very good brightening effect is obtained. The dyebath is superior to that of the Starting Compound 1 in that it is stable, that is to say that the brightening agent does not flocculate. This leads to a substantially better brightening effect.

A fabric of polyester/cotton 67/33 is padded on a foulard at 20° C. with a liquor containing 2.5 g./litre of the guanidinium salt and dried at 80° C. for 2 minutes. A very good brightening of the mixed fabric is obtained. By comparison, the Starting Compound 1 used for preparing the guanidinium salt leads at the same concentration to an appreciable greening of the polyester component of the fabric.

A cotton popeline fabric is padded on a foulard at 20° C. with a liquor containing 0.5 g. of the guanidinium salt per litre of hard water (appr. 12° German hardness), and dried. A good brightening is achieved, whereas the Starting Compound 1 gives virtually no brightening in hard water at a comparable concentration.

EXAMPLE 3

424 g. of the disodium salt of the compound

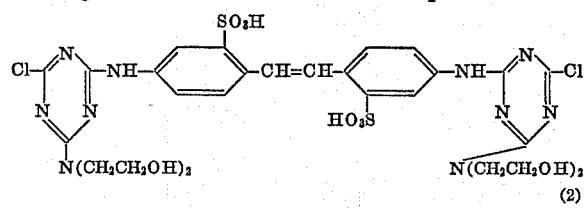

(2)

are suspended in 2000 ml. of water, a solution of 270 g. diphenyl-guanidine hydrochloride in 2000 ml. of water is added, the mixture is stirred at room temperature for three hours, suction-filtered, the residue is washed portionwise with 500 ml. of water and dried at 50° C. in a vacuum. There are obtained 626 g. of the diphenyl-guanidinium salt of the Compound 2, which melts at 200–202° C. (with decomposition) after recrystallisation from methanol.

EXAMPLE 4

6.2 g. of the disodium salt of the compound of the formula

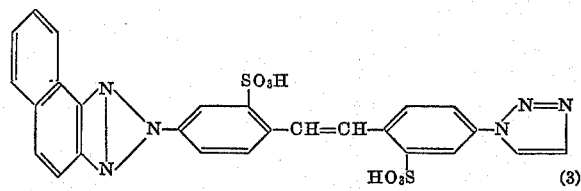

(3)

are added to a suspension of 9.5 g. di-n-dodecyl-guanidine hydrochloride in 120 ml. methanol and 50 ml. of water, and the mixture is stirred at 25° C. for three hours. The product is filtered off with suction, washed with a little water and dried at 50° C. in a vacuum. The yield amounts to 11 g. of the guanidinium salt of the Compound 3, which is characterised by its good solubility in tetrachloroethylene. After being twice recrystallised from ethanol, the salt has a melting point of 141–142° C.

EXAMPLE 5

6.7 g. of the disodium salt of the Compound 1 are added to a solution of 9.5 g. di-n-dodecyl-guanidine hydrochloride in 150 ml. methanol and 50 ml. of water at 30° C., and the mixture is stirred at 20–25° C. for three hours. The product is filtered off with suction, washed portionwise with 50 ml. of water and dried at 50° C. in a vacuum. 12.3 g. of the guanidinium salt of the Compound 1 are obtained.

A fabric of polyamide is dyed at 80° C. for 30 minutes in a liquor ratio of 1:10 in a 0.3% solution of the guanidinium salt so prepared in tetrachloroethylene, and dried. A very good brightening effect is achieved.

Valuable optical brightening agents are also obtained when the procedure of Examples 1–5 is followed but the starting compounds there mentioned are replaced with the starting compounds indicated in the table.

| Stilbene component | Guanidine |
|---|---|
| 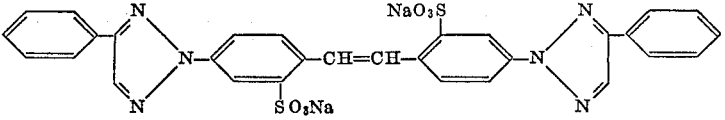 | $H_2N-HN-\underset{\underset{NH}{\|}}{C}-NH_2$ |
| Same as above. | $H_3C-HN-\underset{\underset{NH}{\|}}{C}-NH_2$ |
| Do. | $H_3C-HN-\underset{\underset{NH}{\|}}{C}-NH-CH_3$ |
| Do. | $(n)\,C_{18}H_{37}-HN-\underset{\underset{NH}{\|}}{C}-NH-(n)\,C_{18}H_{37}$ |
| Do. | 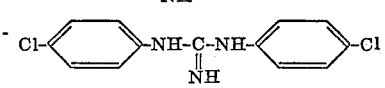 |
| Do. | 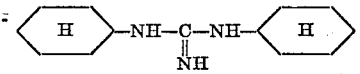 |
| | $(n)\,C_{12}H_{25}-HN-\underset{\underset{NH}{\|}}{C}-NH-(n)\,C_{12}H_{25}$ |
| 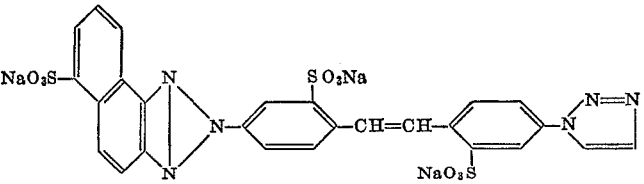 | |
| Same as above. | 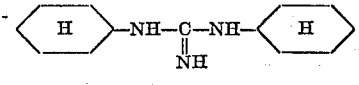 |
| Do. | 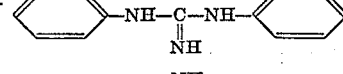 |
| | 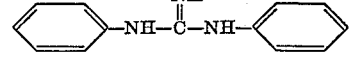 |
| 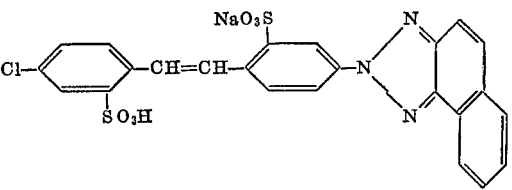 | |
| 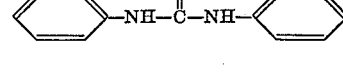 | Same as above. |
| Same as above. | $(n)\,C_{12}H_{25}-HN-\overset{NH}{\underset{\|}{C}}-NH-(n)\,C_{12}H_{25}$ |
| 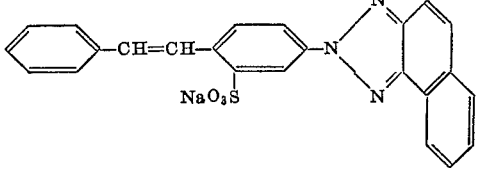 |  |
| Same as above. | 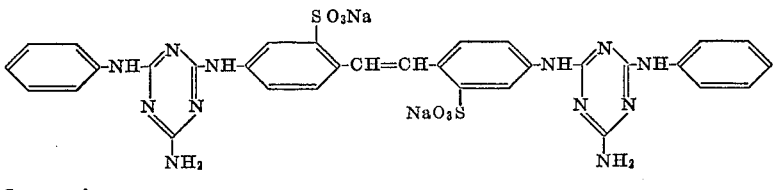 |
| | 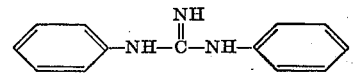 |
| 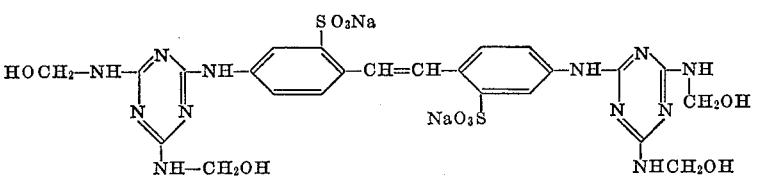 | 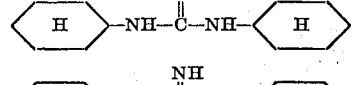 |
| Same as above. | $H_2N-\overset{NH}{\underset{\|}{C}}-NH_2$ |

TABLE—Continued

| Stilbene component | Guanidine |
|---|---|
| [Stilbene with two triazine groups bearing O₂S-morpholine (SO₂), NH-CH₂CH₂OH substituents, and SO₃Na/NaO₃S groups on central phenyl rings] | H₂N–C(=NH)–NH₂ |
| Same as above | C₆H₅–NH–C(=NH)–NH–C₆H₅ |
| [Stilbene with triazine groups bearing NH–C₆H₅, OCH₃, and OC₆H₅ substituents; SO₃Na/NaO₃S on central phenyl rings] | H₂N–C(=NH)–NH–C₆H₅ |
| Same as above | C₆H₅–NH–C(=NH)–NH–C₆H₅ |
| [Stilbene with two pyrazole/triazole rings each bearing a p-NaO₃S–C₆H₄– group; central SO₃Na/NaO₃S] | (n)C₁₂H₂₅–NH–C(=NH)–NH–(n)C₁₂H₂₅ |
| Same as above | Cl–C₆H₄–NH–C(=NH)–NH–C₆H₄–Cl |
| Do | (H₃C)₂N–C(=N–C₆H₅)–N(CH₃)₂ |
| Do | C₆H₅–NH–C(=NH)–NH–C₆H₅ |
|  | Cl–C₆H₄–NH–C(=NH)–NH–C₆H₄–Cl |
| [Stilbene with two triazine groups bearing Cl and N(CH₂CH₂OH)₂ substituents; SO₃Na/NaO₃S on central phenyl rings] | |
| Same as above | C₆H₅(H)–NH–C(=NH)–NH–C₆H₅(H) |
| Do | (n)C₁₂H₂₅–NH–C(=NH)–NH–(n)C₁₂H₂₅ |
| Do | (n)C₁₈H₃₇–HN–C(=NH)–NH–(n)C₁₈H₃₇ |
|  | (n)C₁₈H₃₇–NH–C(=NH)–NH–(n)C₁₈H₃₇ |
| [Stilbene with naphtho-triazole on one side and triazole on other; SO₃Na/NaO₃S on central phenyl rings] | |
| Same as above | C₆H₅(H)–NH–C(=NH)–NH₂ |
| Do | C₆H₅(H)–NH–C(=NH)–NH–C₆H₅(H) |
| Do | piperidine–N–C(=NH)–NH₂ |

TABLE—Continued

| Stilbene component | Guanidine |
|---|---|
| [Structure: H3CO-triazine(NHPh)-NH-phenyl(SO3Na)-CH=CH-phenyl(NaO3S)-NH-triazine(NHPh)-OCH3] | $H_2N-C(=NH)-NH_2$ |
| Same as above | Ph-NH-C(=NH)-NH-Ph |
| Do | $H_3C-HN-C(=NH)-NH-CH_3$ |
| Do | (cyclohexyl)-NH-C(=NH)-NH-(cyclohexyl) |
| Do | $(n)C_{12}H_{25}-NH-C(=NH)-NH-C_{12}H_{25}(n)$ |
| [Structure: Ph-NH-triazine(N(CH2CH2OH)2)-NH-phenyl(SO3Na)-CH=CH-]$_2$ | $H_2N-C(=NH)-NH_2$ |
| Same as above | $(n)C_{12}H_{25}-HN-C(=NH)-NH-(n)C_{12}H_{25}$ |
| Do | $H_2N-HN-C(=NH)-NH_2$ |
| Do | Ph-NH-C(=NH)-NH-Ph |
| Do | (cyclohexyl)-NH-C(=NH)-NH-(cyclohexyl) |
| | $H_3C-NH-C(=NH)-NH-CH_3$ |
| [Structure: H2N-triazine(N(CH2CH2OH)2)-NH-phenyl(SO3Na)-CH=]$_2$ | |
| Same as above | $(H_3C)_2N-C(=NH)-N(CH_3)_2$ |
| Do | (cyclohexyl)-NH-C(=NH)-NH-(cyclohexyl) |
| [Structure: H3CO-CH2CH2O-triazine(N(CH3)CH2CH2SO3H)-NH-phenyl(SO3Na)-CH=]$_2$ | Ph-NH-C(=NH)-NH-Ph |
| Same as above | $(n)C_{12}H_{25}-HN-C(=NH)-NH-(n)C_{12}H_{25}$ |

TABLE—Continued

| Stilbene component | Guanidine |
|---|---|
| 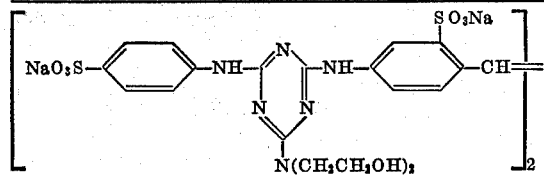 | $H_2N-C-NH_2$<br>$\overset{\|}{NH}$ |
| Same as above | $(n)C_{17}H_{35}HN-C-NH-(n)C_{17}H_{35}$<br>$\overset{\|}{NH}$ |
| Do | 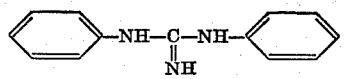 |
| Do | 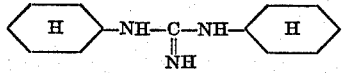 |
| 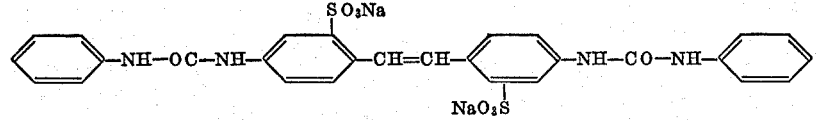 | $NH_2-C-NH_2$<br>$\overset{\|}{NH}$ |
| Same as above | $(n)C_{12}H_{25}-HN-C-NH-(n)C_{12}H_{25}$<br>$\overset{\|}{NH}$ |
| Do | 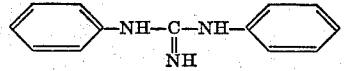 |
| Do | 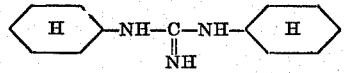 |
| 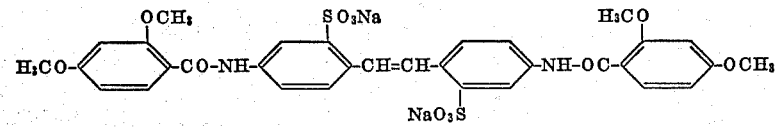 | $H_2N-C-NH_2$<br>$\overset{\|}{NH}$ |
| Same as above | $(H_3C)_2N-C-N(CH_3)_2$<br>$\overset{\|}{NH}$ |
| Do | $(n)C_{12}H_{25}-HN-C-NH-(n)C_{12}H_{25}$<br>$\overset{\|}{NH}$ |
| Do | 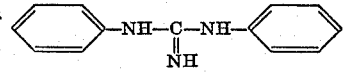 |
| Do | 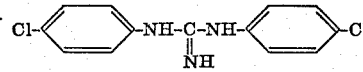 |
| Do | 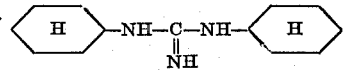 |
| 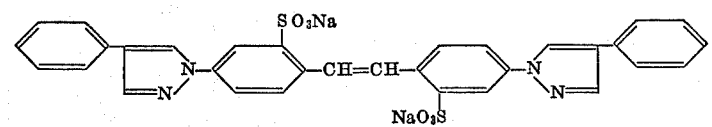 | $H_2N-C-NH_2$<br>$\overset{\|}{NH}$ |
| Same as above | 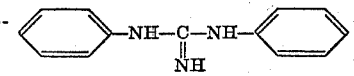 |
| Do | 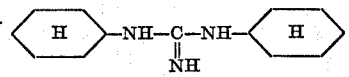 |
| Do | $(n)C_{12}H_{25}-NH-C-NH-(n)C_{12}H_{25}$<br>$\overset{\|}{NH}$ |

Patent claims:
1. Salt of
(A) a sulfonic acid of the formula

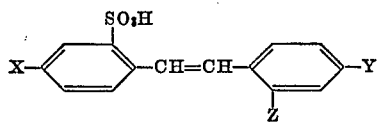

in which
X is

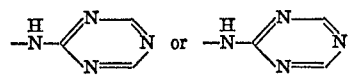

substituted with hydroxy, halogen, amino, methoxy, β-methoxyethoxy, methylamino, β-hydroxyethylamino, bis(β-hydroxyethyl)amino, dimethylamino, anilino, sulfoanilino, diethylamino, benzylamino, β-sulfoethylamino, β-sulfoethylmethylamino, β-hydroxypropylamino, β-hydroxyethylmethylamino, morpholino or methoxyanilino; 1,2,3-, 1,2,4-, or 2,1,3-triazolyl or one of the aforementioned triazolyl radicals substituted with methyl, phenyl, sulfophenyl, tolyl; 2,1,3-naphthotriazolyl; 2,1,3-naphthotriazolyl substituted with sulfo; pyrazolyl, pyrazolyl substituted with methyl or phenyl; or phenylamino carbonylamino;
Y is hydrogen, chlorine, cyano or X;
Z is hydrogen or sulfo;
and
(B) a guanidine of the formula

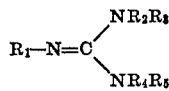

in which
$R_1$ is amino, hydrogen, alkyl of 1–18 carbons, cyclohexyl or phenyl;
$R_2$, $R_3$, $R_4$ and $R_5$ are hydrogen, alkyl of 1–18 carbon atoms, cyclohexyl, phenyl, chlorophenyl or tolyl; or
$R_2$ together with $R_3$ or $R_4$ together with $R_5$, form a divalent alkylene of 4–5 carbons which alkylene is linked to the N-atom.
2. Salt of
(A) a sulfonic acid of the formula

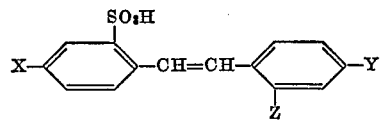

in which
X is

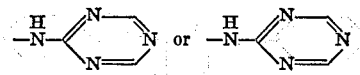

substituted with hydroxy, halogen, amino, methoxy, β-methoxyethoxy, methylamino, β-hydroxyethylamino, bis(β-hydroxyethyl)amino, dimethylamino, anilino, sulfoanilino, diethylamino, benzylamino, β-sulfoethylamino, β-sulfoethylmethylamino, β-hydroxypropylamino, β-hydroxyethylmethylamino, morpholino or methoxyanilino; 1,2,3-triazolyl-1, 1,2,4-triazolyl-2, or 1,2,3-triazolyl-2, or one of the aforesaid triazolyl radicals substituted with methyl, phenyl, sulfophenyl or tolyl; 1,2,3-naphthotriazolyl-2, 1,2,3-naphthotriazolyl-2 substituted with sulfo; pyrazolyl-1, pyrazolyl-1 substituted with methyl or phenyl; phenylamino carbonylamino;
Y is hydrogen, chlorine, cyano or X;
Z is hydrogen or sulfo;
and
(B) a guanidine of the formula

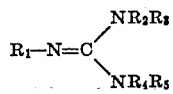

in which
$R_1$ is amino, hydrogen, alkyl of 1–18 carbons, cyclohexyl or phenyl;
$R_2$, $R_3$, $R_4$ and $R_5$ are hydrogen, alkyl of 1–18 carbons, cyclohexyl, phenyl, chlorophenyl or tolyl; or
$R_2$ together with $R_3$ or $R_4$ together with $R_5$, form a divalent alkylene of 4–5 carbons which alkylene is linked to the N-atom.
3. The salt of claim 2 in which said sulfonic acid A has the formula

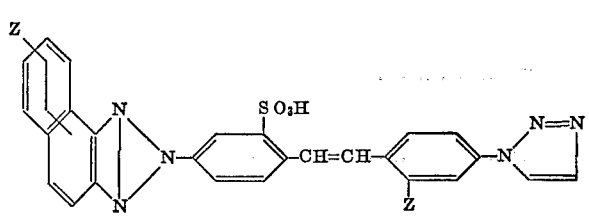

in which Z is hydrogen or sulfo.
4. The salt of claim 2 in which the sulfonic acid A has the formula

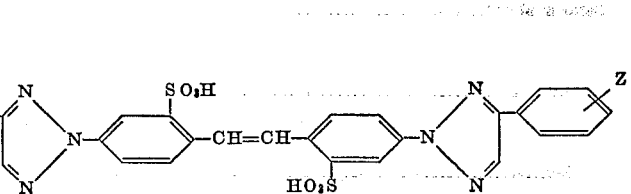

in which Z is hydrogen or sulfo.

5. The salt of claim 2 in which the sulfonic acid A has the formula

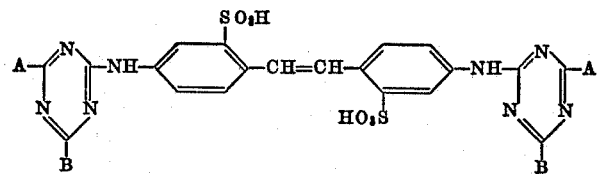

in which
  A is hydroxy, halogen, amino, methoxy, β-methoxyethoxy, methylamino, β-hydroxy ethyl amino, di-(β-hydroxyethyl)amino, dimethyl amino, anilino, sulfoanilino, diethylamino, benzylamino or hydroxymethylamino; and
  B is di(β-dihydroxy ethyl)amino, β-sulfoethylamino, β-sulfoethylmethylamino, β-hydroxy ethylmethylamino, anilino, methoxy anilino, morpholino, phenoxy or hydroxymethylamino.

6. The salt of claim 2 in which the sulfonic acid A has the formula

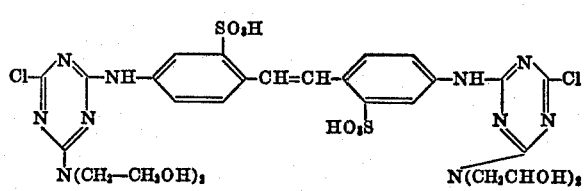

References Cited
UNITED STATES PATENTS

| | | | |
|---|---|---|---|
| 2,580,234 | 12/1951 | Lecher et al. | 260—507 A |
| 2,688,617 | 9/1954 | Hein et al. | 260—240 B |
| 3,318,874 | 5/1971 | Schinzel et al. | 260—240 B |
| 3,479,349 | 11/1969 | Allison et al. | 260—240 B |

JOHN D. RANDOLPH, Primary Examiner

U.S. Cl. X.R.

106—176; 117—33.5 T; 252—301.2 W, 543; 260—240 C, 240 CA, 465 E, 558 A, 559 P